No. 895,227. PATENTED AUG. 4, 1908.
J. M. BACON.
COMBINATION COLOR BOOK.
APPLICATION FILED OCT. 10, 1906.
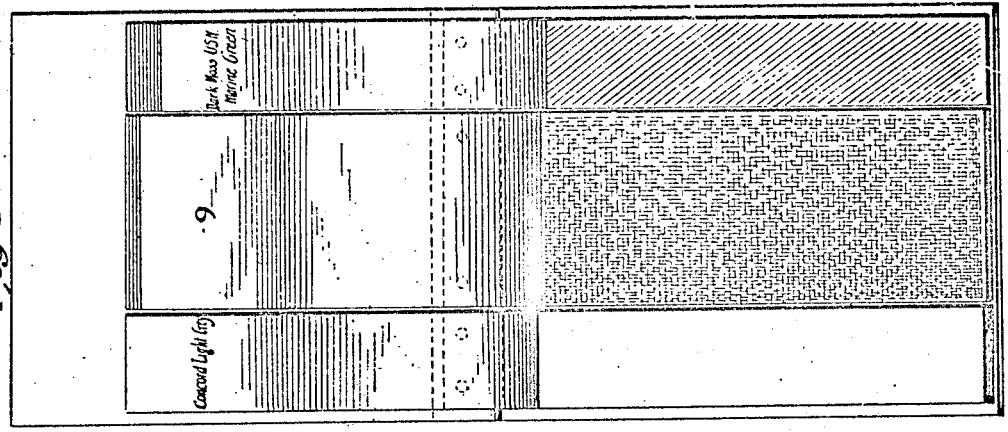
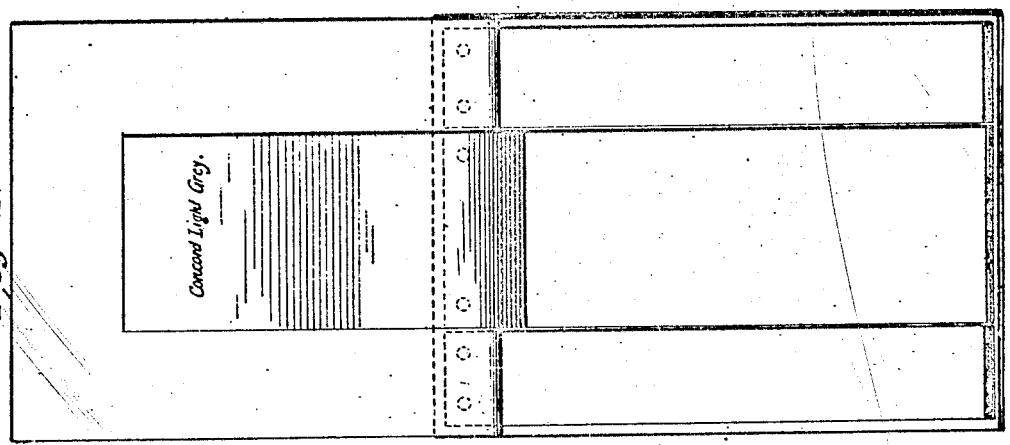
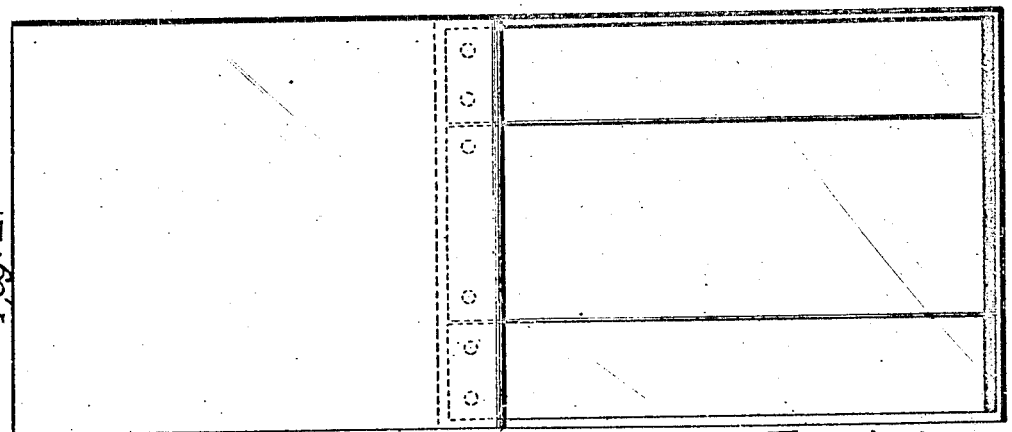
Attest:
C S Mallum
Edward N Saxton
Inventor
J. Murray Bacon.
By Spear, Middleton, Donaldson & Spear
Attys.

UNITED STATES PATENT OFFICE.

JOHN MURRAY BACON, OF CAMBRIDGE, MASSACHUSETTS.

COMBINATION-COLOR BOOK.

No. 895,227.  Specification of Letters Patent.  Patented Aug. 4, 1908.

Application filed October 10, 1906. Serial No. 338,322.

*To all whom it may concern:*

Be it known that I, JOHN MURRAY BACON, a citizen of the United States, residing at Cambridge, Massachusetts, have invented certain new and useful Improvements in Combination-Color Books, of which the following is a specification.

My invention relates to that class of devices used for showing colors and combinations of colors of paints, and particularly in the sale of the application of paints for houses and other structures.

In this class of devices, as heretofore used, the colors are represented upon paper strips which are pasted upon a card or sheet and all these groups of cards, each having several colors or tints, harmonizing with each other and representing the various combinations which the card may contain.

With these cards or sheets the space afforded is necessarily small, comparatively, and the individual cards which represent the colors must necessarily be small and limited in number. Even with a limited number, the show card or sheet is bulky and awkward to handle, and the small individual cards give an imperfect idea of the harmony and effect of the colors grouped thereon.

My invention is designed to obviate these difficulties and consists of a book having sheets or leaves bound therein or otherwise properly connected or contained, the sheets or leaves being sub-divided on common lines parallel with each other. The sheets or sub-divisions each represent a color and the whole a complete series of colors, in a proper and consecutive order, so that by turning up the sub-divisions any desired combination or harmony of colors may be shown.

I have illustrated my invention in the accompanying drawings in which,—

Figure 1 represents the form of the book suited to the purpose, uncovered to show the first leaf. Fig. 2 represents the book with one sub-division turned back, and Fig. 3 shows the same with two sub-divisions turned back so as to disclose three harmonizing colors.

I have represented my invention as embodied in the book form, the leaves being bound in any suitable manner with suitable colors, and this I regard as the most convenient form. This book contains a series of leaves or pages, in number sufficient to represent the complete list of colors offered to the trade, including white, and preferably each sheet or leaf is coated with the pigment of a single color so as to represent that color and material. The leaves are sub-divided on lines parallel with the top and bottom of the page, the sub-division extending throughout the whole body of the leaves, whereby all the leaves are made to consist of sub-sections of the same size and overlying each other, and preferably the top and bottom sub-divisions are narrower and the central wider, for the better effect in showing the colors. For convenience, I print upon the back of the section of each leaf the name of the color or tint represented upon its face, as shown for example in Fig. 1, where the turned back central section is marked "Concord light gray".

It will be understood from this description that by turning back the sections of leaves any possible combination of colors desired may be shown upon the full size of the page. For illustration, Fig. 1 shows the first sheet without any sections turned back; and representing the "Concord light gray". In Fig. 2 the single central section of this color is turned back disclosing a like section underneath of "U. S. N. marine white", but leaving the borders in place. In Fig. 3 I have represented the leaves turned back to disclose the combination of three colors, for example: On the lower narrow strip is "U. S. N. marine white outside gloss"; on the broader central strip "No. 44 colonial yellow"; and on the upper, "U. S. N. marine green, medium moss." This combination is suitable, for example, for painting a house in which the yellow constitutes the body, the white the trimmings, and the green the blinds.

By turning back the sections or leaves in the same manner the other combinations of colors through the scope of the book, may be disclosed, and these colors are shown in their proper relation and upon a full sized page sufficient for a clear appreciation of the effect of the combination, whatever the combination may be, and the same size, page and same disclosure and effect are produced for every combination of colors, and all this within the convenient bulk of a single book or single mass of attached leaves. This single book or mass of connected sheets of different colors thus supplements the ordinary color show card and is capable of much more extensive representation of colors and combinations of colors and tints in a much smaller and more convenient compass.

I claim as my invention:

A color book comprising a series of connected leaves or sheets, each leaf bearing its appropriate color, or tint, and all the leaves being subdivided into sections whereby one or more of the sections may be turned back to show different combinations of colors, substantially as described.

In testimony whereof I affix my signature in presence of two witnesses.

J. MURRAY BACON.

Witnesses:
A. H. McGHAN,
EDWARD N. SAFTON.